United States Patent

[11] 3,571,803

[72] Inventors John H. Huttenhoff
Succasunna;
Richard R. Shively, Convent Station, N.J.
[21] Appl. No. 734,428
[22] Filed June 4, 1968
[45] Patented Mar. 23, 1971
[73] Assignee Bell Telephone Laboratories, Incorporated
Murray Hill, N.J.

[54] ARITHMETIC UNIT FOR DATA PROCESSING SYSTEMS

12 Claims, 4 Drawing Figs.

[52] U.S. Cl. .......... 340/172.5, 235/156
[51] Int. Cl. .......... G06f 7/38, G11c 19/00
[50] Field of Search .......... 235/157; 340/172.5; 235/156

[56] References Cited

UNITED STATES PATENTS 3,103,580 9/1963 Foreman .......... 340/172.5X
3,375,498 3/1968 Scuitto et al. .......... 340/172.5
3,374,467 3/1968 Cast et al. .......... 340/172.5

*Primary Examiner*—Paul J. Henon
*Assistant Examiner*—Melvin B. Chapnick
*Attorneys*—R. J. Guenther and Kenneth B. Hamlin

ABSTRACT: An arithmetic unit of a data processing system having the capability of designating any digit position of the data words being processed as the most significant digit position to thereby increase the efficiency of processing. More than one most significant digit position in a data word may be so designated. Designating a most significant digit position is realized by circuitry in the arithmetic unit which (1) inhibits data from being shifted from the most significant digit position to adjacent positions in one direction, (2) inhibits arithmetic carrys from propagating from the most significant digit position to said adjacent positions, and (3) causes the sign digit of a data word to be copied into the most significant digit position as well as being shifted to adjacent positions in the other direction on certain "arithmetic" shifts of the data word.

INVENTORS J. H. HUTTENHOFF
R. R. SHIVELY
BY R C Lipton
ATTORNEY

ARITHMETIC UNIT FOR DATA PROCESSING SYSTEMS

GOVERNMENT CLAUSE

The invention herein claimed was made in the course of, or under contract with the Department of the Army.

BACKGROUND OF THE INVENTION

1. Field of the Invention

This invention relates to data processing systems and more particularly to the arithmetic units of such systems.

2. Description of the Prior Art

Data processing systems typically include a memory for storing information or data, usually in the form of data words each comprising a certain number of digits, an arithmetic unit for performing arithmetic operations on the data stored in the memory, and a control unit for controlling the transfer of data between the memory and the arithmetic unit and for controlling the operations of the arithmetic unit. The typical arithmetic unit, in turn, includes a plurality of data word registers, an adder, and associated logical circuitry. (See, for example, Flores, Ivan, "The Logic of Computer Arithmetic," Prentice-Hall, Inc., 1968, Chapter 7. When an arithmetic operation of some type is performed on a pair of data words, those words are read from the memory under the control of the control unit into the registers of the arithmetic unit. Since in prior art arithmetic units a particular digit position in the registers and adder was permanently fixed as the most significant digit position, i.e., permanently "wired" to tread digits registered therein as the most significant digits of the data words, it was necessary that the data words read from memory be properly positioned in the arithmetic unit before beginning processing. In other words, it was necessary that the most significant digit of the data words be stored in that position of the arithmetic unit fixed as the most significant digit position.

One arrangement for ensuring proper positioning is simple to connect the digit positions of each data word register in memory directly to certain corresponding digit positions of the input register of the arithmetic unit. The data words would then be initially stored in the memory in certain specific positions so that when read from memory into the arithmetic unit, the most significant digit of the data words would be applied to the most significant digit position of the arithmetic unit's input register. This requirement of storing data words in only certain positions in memory could, however, if variable length data words were used, result in portions of the memory not being used. This is to be avoided if possible.

It has been suggested, to insure proper positioning of the data words while at the same time fully using the memory, to store the words in any available portion of the memory and then, after transferring a word from the memory to the corresponding position in the arithmetic unit, to shift the word so that the most significant digit is registered in the most significant digit position of the arithmetic unit. With this scheme, however, even though the memory is more efficiently utilized, time is wasted in the operation of shifting. It would be desirable, of course, to avoid as much shifting as possible.

An alternative way of avoiding the inefficient use of memory is to provide switching apparatus for reading the data from any portion of the memory to any position in the arithmetic unit. The disadvantage of this arrangement, however, is apparent —increased cost due to the requirement of the switching apparatus.

It is also noted here that the arithmetic units of the prior art data processing systems included only a single most significant digit position designation. Therefore, arithmetic operations such as, for example, addition, could be performed on only two data words at any one time (unless more than one adder and associated equipment were provided in the arithmetic unit).

SUMMARY OF THE INVENTION

It is an object of the present invention, in view of the above-described prior art systems, to provide a data processing system which enables the efficient utilization of the system memory and the fast and economical processing of data.

It is another object of the present invention to provide an arithmetic unit in a data processing system for processing more than two data words simultaneously.

These and other objects of the present invention are illustrated in a specific system embodiment including an arithmetic unit which may, in turn, be viewed as comprising a plurality of interconnected cells, each cell including a portion of each of a plurality of data registers, and a portion of an adder, and corresponding to a particular digit position of the arithmetic unit. That is, one cell contains apparatus for handling a particular digit of the word or words being processed. Logical circuitry is included in each cell and in response to a control unit may designate that cell as the most significant digit position of the arithmetic unit. A cell so designated treats all subsequently received digits as the most significant digits of the data words being processed.

Designation of a cell as being the most significant digit position is defined by the following cell logic:

1. Inhibits data from being shifted from the designated position to adjacent positions in one direction, i.e., inhibits left shifting from the designated position;
2. Inhibits data from being right-shifted into the designated position; and
3. Inhibits arithmetic carry from propagating from the designated position to the left-adjacent positions. If so-called two's complement arithmetic (see the aforecited Flores text) is utilized by the arithmetic unit, then the cell logic would perform the additional function of registering the contents of the most significant digit position back in the designated cell as well as shifting the digit to the right on right-shift operations.

Since any cell may be designated the most significant position, no matter how a data word is received from memory and register in the arithmetic unit, the word may be processed without initially having to align or shift the data word, simply by designating the appropriate cell of the arithmetic unit as the most significant digit position. This, of course, allows for the efficient utilization of the memory since data words need not be prepositioned in the memory before transferrence to the arithmetic unit.

Not only may any cell be designated as the most significant digit position, but also more than one cell may be so designated. This allows for the processing of more than two data words simultaneously. That is, since more than one cell may act as the most significant digit position, more than one data word may be registered adjacently in the arithmetic unit and then simultaneously combined with other data words.

BRIEF DESCRIPTION OF THE DRAWING

A complete understanding of the present invention and of the above and other objects and advantages thereof may be gained from a consideration of the following detailed description of a specific illustrative embodiment presented herein below in connection with the accompanying drawing described as follows.

2 graphically illustrates storage of data words in memory and transfer therefrom to an arithmetic unit.

Figure 3:
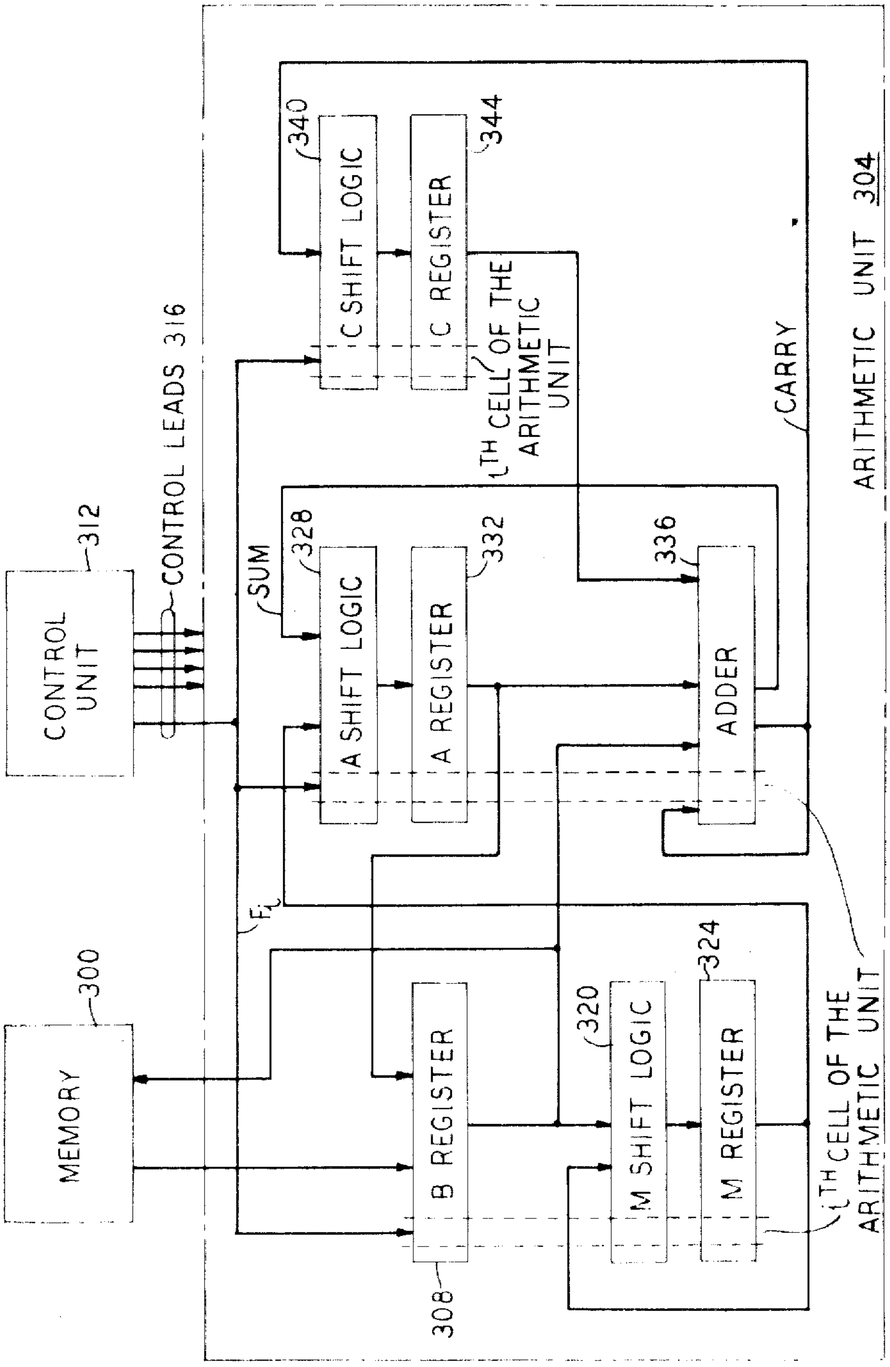

FIG. 3 shows a general block diagram of an arithmetic unit made in accordance with the principles of the present invention.

Figure 4:
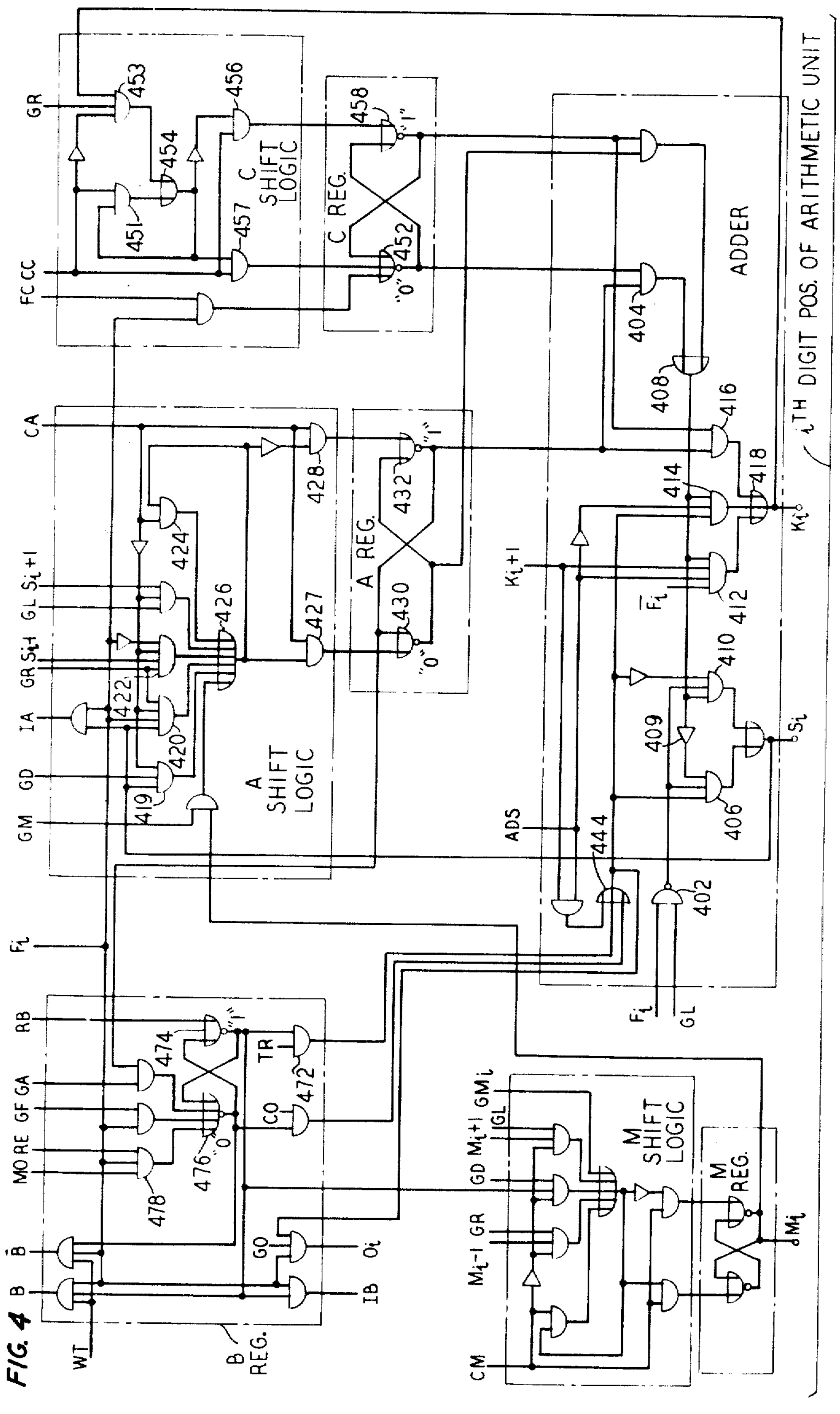

FIG. 4 shows one illustrative embodiment of one cell of the arithmetic unit shown in FIG. 3.

DETAILED DESCRIPTION

Figure 1:
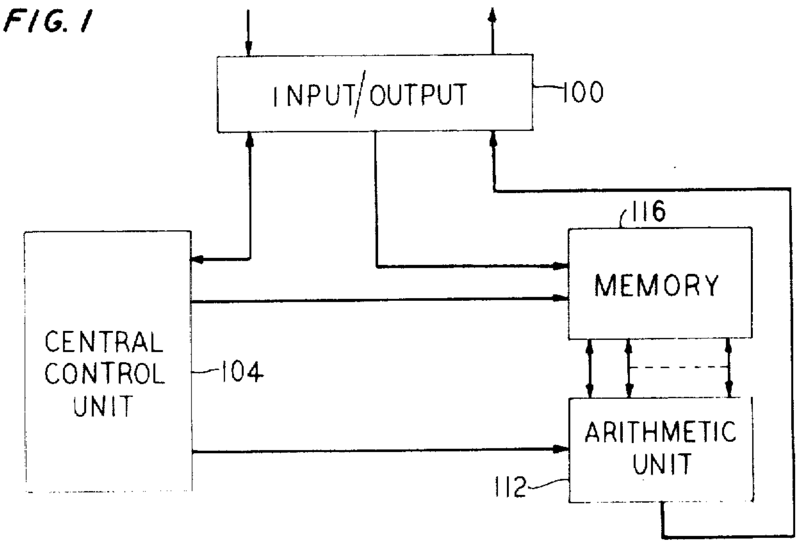
FIG. 1 shows a general block diagram of a data processing system.

A general data processing system configuration is shown in FIG. 1. Data to be processed is applied via the input/output unit 100 to a memory 116. Data processing instructions are also applied via the input/output unit 100 to a central control unit 104. In accordance with these instructions, the central control unit 104 applies control signals to the memory and an arithmetic unit 112 to thereby direct the processing of data. Data words are read from memory into instructions, arithmetic unit for processing and the resultant transferred back to the memory for storage or transferred from the system via the input/output unit 100.

Figure 2:
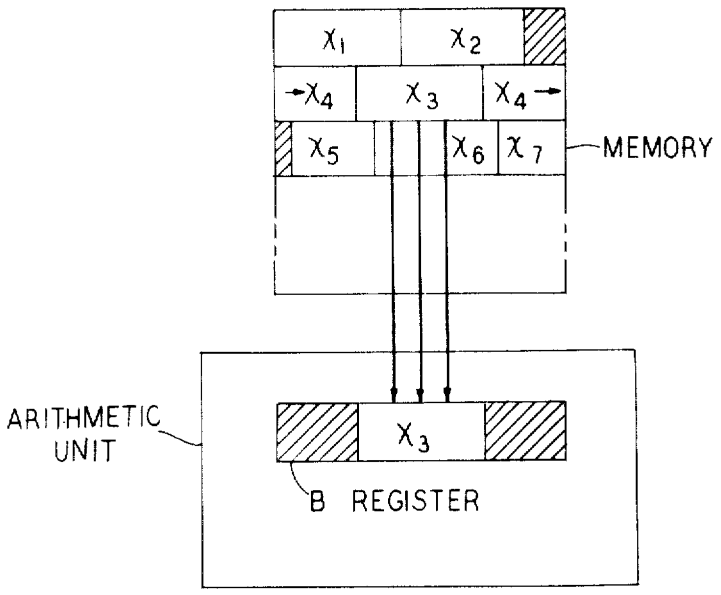

FIG. 2 is a graphical representation of the storage of data in a word-organized memory without conforming to word boundaries, and the transfer therefrom to an input register —designated the B register —of an arithmetic unit. Since, as mentioned earlier, any digit position of the arithmetic unit may be designated as the most significant digit position, data words may be stored anywhere in memory, read from the memory into the arithmetic unit, and then operated upon without the requirement of an initial shift or alignment of the data words (to align the most significant digit of the word with the most significant digit position of the arithmetic unit). Furthermore, data words may "wrap around" in the arithmetic unit registers and thus also in the memory registers such as shown with the data word designated $X_4$ in FIG. 2, thereby further facilitating the efficient use of memory.

An illustrative embodiment of an arithmetic unit made in accordance with the present invention is shown in FIG. 3. Data words from a memory 300 are applied to the arithmetic unit 304 via an operand register 308 designated as the B register and under the control of a control unit 312. Depending on the operation to be performed, the words are then transferred to either one or two registers—register 324 designated the M register, or accumulator register 332 designated the A register. (This will be discussed in more detail later). A third register 344 designated the C register is utilized to register "-carrys" generated by an adder 336 in the performance of arithmetic operations.

Prior to performance of an arithmetic operation, the control unit 312 applies a signal or signals via control leads 316 to one or more cells of the arithmetic unit, thereby designating said cell(s) as the most significant digit position(s). A cell, as indicated earlier, comprises circuitry from each register, from each register's associated logic, and from the adder for operating upon data word digits occupying a particular digital position. The cells, however, are interconnected to two adjacent cells so that digits may be transferred between cells. There are no so-called "end positions" in the registers of the arithmetic unit, but rather, the registers are arranged in a circular configuration so that every cell is connected to two adjacent cells. The designation of a representative cell—identified as the $i^{th}$ cell—is shown in FIG. 3.

The control unit 312 maintains a record in its memory of the initial and terminal digit positions of each data word in the memory 300 and thus can determine which position(s) in the arithmetic unit 304 to designate as the most significant digit position(s) when a word is transferred thereto. Thus, for example, if after data had been applied to the arithmetic unit, the $i^{th}$ cell were to be designated as the most significant digit position, the control unit 312 would apply a signal over the $F_i$ lead to the $i^{th}$ cell.

An example of the operation of the arithmetic unit 304 will not be given assuming that two data words are to be multiplied together. The operation of multiplication, as well as the other arithmetic operations, is carried out in a manner similar to the operation of standard arithmetic units except for the variable most significant digit location capability.

The first of the two data words to be multiplied (the multiplier) is transferred from the memory 300 to the B register 308, as heretofore discussed, and then transferred via shift logic 320 to the M register 324. The second word (the multiplicand) is then read from memory 300 and applied to the B register. A signal is then applied over the appropriate one of leads 316, thereby designating one of the cells of the arithmetic unit as the most significant digit position.

The multiplication process is begun by the control unit 312 examining the least significant bit in the M register to determine whether the bit is a binary 1 or 0. (This binary notation is standard and need not be discussed in detail.) If a 1 is detected, the contents of the A, B, and C registers are applied to the adder 336 and there combined to obtain a partial sum (a sum without carrys) and carrys. (Of course, in the first step of the operation, the A and C registers have no contents so that the contents of the B register would comprise the partial sum and there would be no carrys.) The partial sum is then applied to the shift logic 328 where it is right-shifted one position and then registered in the A register. The carrys are applied to the shift logic 340, right-shifted one position, and then registered in the C register. (It should be noted that if only one digit position of the M register contains the necessary logic to enable the control unit 312 to examine its contents, during the right shifting of both the partial sum and the carrys, the contents of the M register would be right shifted by one so that the next digit of the multiplier would be in position to be examined by the control unit 312.)

If a 0 is detected in the position of the M register being examined, then only the contents of the A and C registers (not B register) are applied to the adder 336 and the result registered in the A and C registers.

This process of examining the digits of the multiplier, adding, right shifting and storing is repeated until all digits of the multiplier have been examined. The final operation in the process is to combine the contents of the A and C registers (i.e., add their contents in the adder 336) and propagate the carrys, to obtain the final product which is registered in the A register. Multiplication operations similar to the above are standard operations (except for the variable most significant digit location) and have been described in detail elsewhere. (See Flores supra, at pp. 154—157).

Before discussing FIG. 4 which shows one cell of the arithmetic unit of FIG. 3, the incidents or attributes which a digit position or cell must have in order to function as the most significant digit position will be discussed. The four incidents of a most significant digit position in applicants' embodiment are as follows:

1. Data may not be shifted from the most significant digit position to the adjacent position in one direction. Normally this "one direction" is represented graphically as being to the left of the most significant digit position, and thus in the prior art the leftmost position in a register is usually fixed as the most significant digit position. The convention of requiring the inhibiting of shifting of data from the most significant digit position to the left-adjacent position will be adopted here. This, of course, subsumes that the digit positions to the right of the most significant digit positions to the right of the most significant digit position will contain digits of decreasing "weight" or "significance."Since with applicants' arrangement, word registers "wraparound," i.e., have no "end positions," digits of less "weight" might actually be registered to the left of the most significant digit position, but these positions should be considered as simply being an extension of the positions to the right.
2. Data may not be right shifted into the most significant digit position.
3. Arithmetic carrys which may be generated in an addition or multiplication operation may not be propagated from the most significant digit position to the left-adjacent position.
4. On right shifts, the contents of the most significant digit location are retained or "copied back" into the most significant digit position as well as being shifted on e position to the right. This attribute is present in applicants' embodiment because of the type of arithmetic employed in the arithmetic unit—two's complement arithmetic. This will be explained hereafter. If another type of arithmetic were used, only the first three attribute would be required.

In two's complement arithmetic, positive numbers are represented in the usual binary digit notation—a sequence of 0's and 1'R—with a 0 used to represent the positive sign. Thus the number +18 would be represented as 0.10010 with a scale factor $2^{5}$ where the first or left most zero represents the positive sign and is called the sign bit. The scale factor indicates where the binary point should be placed. In our case, since the exponent in the scale factor is five, the binary point in the binary representation would be five positions to the right of its present location.

A negative number in the two's complement arithmetic is formed by taking its positive counterpart and subtracting it from 2.00000. For example, to obtain −18 subtract the two's complement representation for +18 from 2.00000, thus $$\begin{array}{r} 2.00000 \\ -\underline{0.10010} \\ 1.01110 \end{array}$$

and 1.01110 with a scale factor $2^{5}-18$. Note that the sign bit is 1 for negative numbers. When scale factors are disregarded, it is noted that the range of values represented in the above-defined notation is −1 >(value) >+1. The representation for −1 in this notation is 1.000.

An example, will now be given illustrating the need for a most significant position or cell to have attribute (4) above. Assume that it is desired to multiply −1 by +½to obtain −½or

| | | |
|---|---|---|
| multiplicand | 1.000 | −1 |
| multiplier | 0.100 | +½ |
| | 1.100 | −½ |

and that the most significant digit positions are those occupied by the sign bits. The operation performed by the arithmetic unit in carrying out this multiplication is to add the multiplicand (contents of B register of FIG. 3) to the contents of the A and C registers (in this case nothing) and then right shift. That is, the multiplicand 1,000 would simply be right-shifted into the A register. In order to obtain −½=1.100 in performing this right shift, it is necessary to "copy back" or retain the sign bit in the most significant digit location as well as shifting it one position to the right which is precisely in accordance with attribute (4) above.

Specific illustrative circuitry for implementing the above four attribute or incidents of a most significant digit position will now be discussed. FIG. 4 shows illustrative logical circuitry for $i^{th}$ cell of the arithmetic unit of FIG. 3. The $i^{th}$ digit position logic for each of the registers and adder of the arithmetic unit are labeled accordingly. The following table defines the function of each of the leads shown in FIG. 4. Those symbols with an asterisk identify leads from the central control unit.

GENERAL $F_i$* =Designate the significant $i^{th}$ digit position of the arithmetic unit as the most significant digit position. Apply data from the central control unit to the arithmetic units.

GO* =Gate Output from the arithmetic unit.

$O_i$ =Output from the $i^{th}$ bit position of the arithmetic unit. (Note that the output is always derived from the B register.)

ADS* =Propagate carries for ADder aSsimilation. This operation is the terminal operation in an addition or multiplication process in which the contents of the A and C registers are combined to obtain a resultant.

$S_i$ =Sum output from $i^{th}$ digit position of the adder.

$K_i$ =Carry output from $i^{th}$ digit position of the adder.

B REGISTER

RB* =Reset B register.

GA* =Gate contents of A register into B register.

GF* =Gate logical 1's on F leads into the B register.

RE* =Gate data from memory into B register.

MO =Memory Output.

WT* =Write contents of B register into memory.

B, $\overline{B}$ =Inputs to memory from B register.

TR =Gate contents of B register into Adder.

CO* =Gate complement of contents of B register into Adder.

IB =Indicates contents of those digit positions of the B register whose corresponding F leads are "high."

A, C, AND M REGISTERS

GD* =Gate Down

GR* =Gate Right

GL =Gate Left $M_i$ =Output of $i^{th}$ digit position of the M register.

FC* =Gate logical 1's on F leads into the C register. This lead for the C register is similar to the GF lead of the B register.

CC* =Clock lead for C register.

CA =Clock lead for A register.

CM* =Clock lead for M register.

IA =Indicates output of those positions of the Adder whose corresponding F leads are "high."

GM* =Gate contents of M register into A register.

$GM_i$* =Gate logical 1 in $i^{th}$ digit position of M register.

The operation of the arithmetic unit and in particular the $i^{th}$ cell of the unit (FIG. 4) will now be described with respect to carrying out the four incidents of a most significant digit location designation. It will be assumed that the $i^{th}$ cell is the most significant digit position so designated by a "high" condition being applied to lead $F_i$. Recall that the first-noted incident of a position being designated as the most significant digit position is that data may not be shifted from the designated position to the left. It can be seen from FIG. 4 that if the $F_i$ lead is "high," and the GL lead (gate or shift left) is made "high," the output of AND-NOT gate 402 of the adder is made "low" and neither AND gate 406 nor AND gate 410 are enabled so that the adder output $S_i$ is not generated. Thus the output of the $i^{th}$ cell of the adder may not be applied to the $i-1^{th}$ cell (left-adjacent) on a shift left command, as required.

The second incident of a position being the most significant digit position is that data may not be right-shifted into that position. Thus, when $F_i$ is "high" and the GR (gate right) lead is made "high," AND gate 422 is not enabled and so the output of the $i-1^{th}$ digit position of the adder (received over lead $S_i$—) is not registered in the $i^{th}$ digit position of the A register. Thus a right shift from the left-adjacent cell into a most significant digit position is inhibited.

The third incident or attribute is that carrys are not propagated from the most significant digit position to the left-adjacent cell. When the $F_i$ lead is "high," AND gate 412 of the adder may not be enabled. Thus, a carry output over lead $K_i$ (from the most significant digit position) will not be generated via AND gate 412. Likewise, it can be shown that for all operations in which AND gate 414 are enabled, with the exception of adder assimilation, the adder outputs $S_i$ and $K_i$ are right-shifted, therefore the $K_i$ output of the most significant digit position cannot be shifted into the $i-1^{th}$ position. During assimilation, a "high" on the ADS lead inhibits the enablement of AND gate 414.

Finally, it can be shown that AND gate 416, the only other means for generating a carry, is never enabled when the $F_i$ lead is "high." that is, the two inputs to the AND gate 416 will never both be 37 high" if the $i^{th}$ position is the most significant digit position. It has thus been shown that carrys may not be propagated from the most significant digit position to the left-adjacent position.

The last-listed incident of a most significant digit position for applicants' embodiment is that the contents of the most significant digit position are retained in the position as well as being shifted to the right on right shifts. To show this, assume that $F_i$ lead is "high" designating the $i^{th}$ cell as the most significant digit position and that the output of OR-NOR NOT gate 432 is "high," indicating storage of a 1 in the $i^{th}$ position of the A register. As indicated above, if the most significant digit position of the A register is storing a 1, the corresponding position of the C register will be storing a 0, that is, OR-NOT gate 452 will be "high." Under these conditions, AND gate 404 of the adder is enabled which, inturn, enables OR gate 408. Since the GL lead is not "high" at this time, the output of AND-NOT gate 402 is "high." Also the output of AND gate 472 is "low" (leads TR and CO pulsed), being pulses), thus making the output of OR gate 444 "low." AND gate 410 is thus enabled thereby causing a "high" on lead $S_i$. Upon application of a shift-right pulse over lead GR and a "low" condition on lead CA as well as the previously noted "high" on lead $F_i$, AND gate 420 is enable causing the enablement of OR gate 426. The CA lead is then made "high" enabling AND gate 424 which, in turn, maintains OR gate 426 in the enabled state. AND gate 427 is also enabled thereby ensuring the maintenance of a "low" output from OR-NOT gate 430 which is one input to OR-NOT gate 432. The other input to OR-NOT gate 432 is "low" since AND gate 428 is not enabled due to the inversion of the "high" output from OR gate 426. With two "low' inputs, the output of OR-NOT gate 432 is "high" and thus the storage of a 1 in the most significant digit of the A register is maintained as required. It can likewise be shown that a 0 in the most significant digit position of the A register would be maintained there on a right shift.

To show that on a shift right operation, the contents of the most significant digit position are also shifted right (as well as retained), assume that the $i^{th}$ cell of FIG. 4 is the right-adjacent cell of the most significant digit position (which would be the $i—1^{th}$ cell). Also assume that the output from the adder in the $i—1^{th}$ cell—$S_i—1$—is a 1. Under these conditions, upon application of a "high" signal on lead GR, a "low" signal on lead $F_i$ and a "low" signal on lead CA AND gate 422 is enabled. Enablement of AND gate 422, in turn, causes the enablement of OR gate 426. Upon application of a "high" signal over lead CA AND gate 424 is enabled to thereby maintain the output of OR gate 426 "high." AND gate 427 is also enabled which causes the output of OR-NOT gate 430 to go "low" (if it had previously been "high" ) or to be maintained "low" (if it had previously been " low" ). Thus one input to OR-NOT gate 432 is made "low" The other input to OR-NOT gate 432 is also "low" since the output of OR gate 426 is "-high" is invented, making the output of AND gate 428 "low." With both inputs "low," the output of the OR-NOT gate 432 is high indicating storage of a 1. In this manner, a 1 is shifted from the most significant digit position—$i—1^{th}$ —to the right-adjacent cell—$i^{th}$ —on a shift right operation. Shifting of a 0 is carried out in similar fashion.

A simple addition operation will not be described with reference to FIG. 4 to indicate the general operation of the arithmetic unit. The first step in the addition operation is to clear registers, A, B, and C. The B register is cleared by applying a pulse to the RB lead thereby causing the output of OR-NOT gate 474 indicating be "low" indicating the storage of a 0 as required. The A register is cleared by applying a "high" signal to the CA lead which in conjunction with a "low" output on OR gate 426 which is inverted to a "high" condition enables AND gate 428, thereby causing the output of OR-NOT gate 432 to be made "low" indicating the storage of a 0. The C register is cleared by applying a "high" signal to lead CC which in conjunction with a low output from OR gate 454 which is inverted to a "high" condition enables AND gate 456, thereby causing the output form OR-NOT gate 458 to be made "low" indicating storage of a 0. The next step of the operation is to apply the first of the two words to be added from the memory into the B register. This is done by applying a "high" signal to the lead RE and to the F lead. If the memory output lead MO is "high" indicating the presence of a 1, then AND gate 478 is enabled causing the output of OR-NOT gate 476 to be made "low" which in conjunction with lead RB being "low" causes the output of OR-NOT gate 474 to be made "high," thereby storing a 1 in that position of the B register. Of course, if the memory output lead MO is "low," then AND gate 478 will not be enabled with the result that a 0 will be retained in that position of the B register. The contents of the B register are then gated via the adder into the A register. This is done by applying "high" signal over lead TR of the B register to AND gate 472. In those positions of the B register in which a 1 is stored, AND gate 472 is enabled, thereby enabling OR gate 444. The "high" output of OR gate 444 combines with the "high" output of AND-NOT gate 402 (since GL is " and the "low" output of OR gate 408 (since O's are stored in both the A and C registers) which is inverted to a "high" by an inverter 409 to enable AND gate 406, thereby causing a "high" output on lead $S_i$. Upon application of a "-high" signal to lead GD and a "low" signal to lead CA, AND gate 419 is enabled causing enablement of OR gate 426. Upon the subsequent application of a "high" signal to lead CA, AND gate 424 is enabled thus maintaining OR gate 426 in the enabled condition. As described earlier, this combination of conditions results in the registration of a 1 in the A register and the transfer of data from the B to the A register is completed.

The next step of the operation is to clear the B register and then apply thereto the second word from memory. After this, the contents of the A and B registers are applied to the adder to be there combined. Assume for this explanation that a 1 is stored in the $i^{th}$ digit positions of both the A and B registers and that the $i^{th}$ position is not the most significant digit position (thus $F_i$ lead is "low"). The 1 output from the A register, i.e., from OR-NOT gate 432, combines with the "high" output from OR-NOT gate 453 of the C register (indicating storage of a 0) to enable AND gate 404 thereby enabling OR gate 408. The output of OR gate 408 in turn combines with the output of OR gate 444 to enable AND gate 414 (lead ADS being "low" thereby enabling OR gate 418 and causing a "high" output on lead $K_i$. Since the digits registered in the $i^{th}$ position of the A and B registers are both 1's, neither AND gates 406 or 410 are enabled and thus the output on lead $S_i$ (the sum output) is "low"

The carry output $K_i$ is next stored in the $i^{th}$ digit position of the C register while the sum output $S_i$ is stored in the $i+1^{th}$ digit position of the A register. The storage of the carry output is accomplished by applying a "high" signal to lead GR and by applying a "low" signal to the CC lead thereby enabling AND gate 453 which, in turn, enables OR gate 454 of the C register. Upon subsequent application of a "high" signal to lead CC, AND gate 451 is enabled along with AND gate 457, causing a "low" output from OR-NOT gate 432 and thus a "low" input to OR-NOT gate 458. The other input to OR-NOT 458 is "low" since AND gate 456 is disabled when OR gate 454 is enabled. With both inputs to OR-NOT gate 458 low, of course, the output is made "high" indicating the registration of a 1. The sum output $S_i$ is registered in the $i+1^{th}$ position of the A register also upon the application of a "high" signal to lead GR and a "low" signal to lead CA. In our example, the output $S_i$ was a 0, therefore AND gate 422 of the $i+1^{th}$ cell would not be enabled upon the application of a "high" signal to lead GR. Likewise OR gate 426 would not be enabled and therefore upon the subsequent application of a "high" signal to lead CA, AND gate 428 would be enabled causing a "low" output from OR-NOT gate 432. This output serves as one input to OR-NOT gate 430. The other input to OR-NOT gate 430 is also "low" since AND gate 427 is not enabled, OR gate 426 being "low." With two "low" inputs to OR-NOT gate 430, the output of the gate is "high" indicating the registration of a 0.

At this stage of the addition operation, so-called partial sums (the outputs of the S leads of the adder) are registered in the A register and the so-called carrys (the outputs from the K leads of the adder) are registered in the C register. To combine the contents of the A and C register to obtain the final sum, the contents of these register are "assimilated" in the A register. That is, the contents of the A and C registers are simultaneously applied to the adder, the resulting carrys allowed to propagate left, and the result registered in the A register. This is done by applying a "high" signal to leads ADS and GL and first a "low" signal to lead CA followed by a "-high" signal. This results in the stored carrys being propagated to the left and combined with the partial sums to obtain the final sum which, as mentioned earlier, is registered in the A register. (of course, the carrys are not propagated to the left of that cell designated as the most significant digit position.)

The procedure for carrying out subtraction is indicated below. The leads to be pulsed are indicated in parenthesis.

Clear A, B, and C registers.
($\overline{CA}$ RB, $\overline{CC}$)
Gate first work from memory to B register.
(RE, F)
Gate contents of B register into A register.
(TR, GD, $\overline{CA}$)
(CA)
Clear B register.
(RB)
Gate second word from memory to B register.
(RE, F)
Gate 1 into least significant digit position of C register.
(FC, F lead of least significant digit position)
Apply a "high" signal to F lead of most significant digit position for duration of operation.
Gate complement of contents of B register into Adder.
(CO)
Store Adder output in A and C registers.
(GR, $\overline{CC}$, $\overline{CA}$)
(CC, CA)
Assimilate result and store in A register.
(ADS, GL, $\overline{CA}$)
(CA)

The procedure for multiplication which has been generally described earlier with respect to FIG. 3 is given below.

Clear A, B, and C registers.
($\overline{CA}$, RB, $\overline{CC}$)
Gate multiplier from memory to B register.
(RE, F)
Gate contents of B register into M register.
(GD, $\overline{CM}$)
Clear B register.
(RB)
Gate multiplicand from memory to B register.
(RE, F)
Apply a "high" signal to F lead of most significant digit position of multiplicand. (IF there are two or more multiplicands to be multiplied by a common multiplier, then the F leads corresponding to the most significant digit positions of each multiplicand would be made "high.")
Examine contents of least significant digit position of M register. (This is done by the central control unit.)
If 1, the contents of the B and A registers are applied to adder and a right shift performed.
(TR, GR, $\overline{CA}$, $\overline{CC}$, $\overline{CM}$)
(CA, CC, CM)
If 0, gate contents of A register to adder and right shift.
(GR, $\overline{CA}$, $\overline{CC}$, $\overline{CM}$)
(CA, CC, CM)
Repeat above step until all but sign bit of the multiplier have been examined.
Examine sign bit of multiplier.
If 0, gate right.
(GR, $\overline{CA}$, $\overline{CC}$)
(CA, CC)
If 1, subtract contents of B register from contents of A register.
(FC, F lead of least signigicant digit position.
(CO)
(GR, $\overline{CC}$, $\overline{CA}$, $\overline{CM}$)
(CC, CA)
Assimilate product and store in A register.
(ADS, GL, $\overline{CA}$)
(CA)

The procedure for division is as follows.

Clear A, B, and C registers.
($\overline{CA}$, RB, $\overline{CC}$)
Gate dividend from memory to B register.
(RE, F)
Gate contents of B register into A register.
(TR, GD, $\overline{CA}$)
(CA)
Gate divisor from memory to B register.
(RE, F) Since the range of values of partial remainders may be twice that of the divisor, room must be made for these remainders; this is done by shifting the sign bits of the divisor and dividend one position to the left (while also retaining the bits in their present positions). This shifting is done as follows.
Examine divisor sign (done by central control unit).
If 1, set next position to the left 1.
($F_{-1}$, GF)
Examine dividend sign and if it is 1, set next position to left 1.
($F_{-1}$, FC)
Compare sign bits of divisor and dividend (done by central control unit). If alike, subtract contents of B from contents of A.
(Execute subtraction procedure)
Left shift the contents of registers A and M.
Gate a 1 in the position of the M register thus vacated.
(GL, CA, CM, GM of position vacated)
($\overline{CA}$, $\overline{CAM}$)
If different, add contents of A and B.
(Execute addition procedure)
Left shift the contents of registers A and M.
(GL, CA, CM)
($\overline{CA}$, $\overline{CM}$)
Repeat "compare" step above for each digit of quotient desired. Quotient is obtained in the M register.

It is to be understood that the above described arrangement is only illustrative of the application of the principles of the present invention. Numerous other arrangements may be devised by those skilled in the art without departing from the spirit and scope of the invention. For example, a plurality of arithmetic units might be utilized in a "global" processor such that each unit would operate simultaneously on distinct sets of data.

We claim:

1. In a data processing system having a central control unit, at least one multidigit position register for registering data words, and shift logic responsive to said control unit for shifting the data words in said register;
means for applying data signals to any digit position of said register to designate said position as the most significant digit position for arithmetic operations;
means responsive to said signals for inhibiting the shifting of data from said designated position to a position adjacent thereto in one direction and for inhibiting the shifting of data from said adjacent position into said designated position; and
means responsive to said signals for causing the data registered in said designated position to be reregistered therein as well as shifted to a position adjacent thereto in a second direction when said shift logic causes the shifting of data in said second direction in said register.

2. In a system as in claim 1 further comprising means for simultaneously applying signals to a plurality of the digit positions of said register to thereby designate said positions as the most significant digit positions.

3. A data processing system comprising a signal source;
An arithmetic unit which includes;
a plurality of identical cells each interconnected to two adjacent cells for registering and processing data; and
means responsive to said signal source for shifting the data registered in each cell to adjacent cells;
means for applying signal to any cell of said arithmetic unit to designate said cell as the most significant digit position for arithmetic operations;

means responsive to said signals for inhibiting the shifting of data from said designated cell to an adjacent cell in a predetermined direction and for inhibiting the shifting of data into said designated cell from said adjacent cell; and means responsive to said signals for causing the data registered in said designated cell to be reregistered therein as well as shifted to the adjacent cell in the direction opposite said predetermined direction when said shifting means causes the shifting of data in said opposite direction in said identical cues.

4. An arithmetic unit of a data processing system comprising;

a plurality of identical cells each interconnected to two adjacent cells, said identical cells including a plurality of data storage registers for storing data word digits and also including adder means for processing the data word digits of selected ones of said registers to obtain partial sums and arithmetic carrys;

means for applying data words to and retrieving data words from said identical cells;

means for shifting the partial sums and arithmetic carrys obtained in the identical cells to adjacent cells; and each of said identical cells further including circuitry responsive to applied signals for inhibiting the shifting of partial sums obtained in the cell to the adjacent cell in a first direction whereby the cell is designated as the most significant position of said unit.

5. An arithmetic unit as in claim 4 wherein said identical cells each further comprise means responsive to said applied signals for inhibiting the shifting of partial sums obtained in said adjacent cell to said designated cell.

6. An arithmetic unit as in claim 5 wherein said identical cells each further comprise means responsive to applied said signals for inhibiting the shifting of arithmetic carrys from said designated cell to said adjacent cell.

7. An arithmetic unit as in claim 6 wherein said identical cells each further comprise means responsive to said applied signals for causing any partial sums obtained in said designated cell to be reregistered therein and to be shifted to the adjacent cell in a second direction upon the shifting or partial sums in said second direction in said identical cells by said shifting means.

8. An arithmetic unit as in claim 7 further comprising means for simultaneously applying signals to a plurality of cells to designate said plurality cells as the most significant positions of said arithmetic unit.

9. In a data processing system having a signal source and an arithmetic unit, said arithmetic unit comprising a plurality of multidigit position registers for registering data, adder means for combining the registered data of the corresponding digit positions of selected ones of said registers to generate partial sums and arithmetic carrys, and circuitry responsive to said signal source for causing said partial sums and arithmetic carrys to be shifted and applied to digit positions of said registers adjacent to those positions in which said sums and carrys were generated;

means for applying signals to any digit position of one of said registers and to the corresponding position of said adder means to designate said position as the most significant digit position for arithmetic operations; and means responsive to said signals for inhibiting the generation of said partial sums in said designated position when said circuitry causes shifting of partial sums in a predetermined direction in said registers.

10. In a system as in claim 9 further comprising means responsive to said signals for inhibiting the application of said partial sums to said designated position when said circuitry causes shifting of partial sums in the direction opposite said predetermined direction in said registers.

11. In a system as in claim 10 further comprising means responsive to said signals for inhibiting the application of said carrys to the position adjacent to said designated position in said predetermined direction.

12. In a system as in claim 11 further comprising means responsive to said signals and to a shift of data in said opposite direction in said registers for registering in said designated position and in the adjacent position in said opposite direction the partial sums generated in said designated position.